United States Patent
Pahlitzsch et al.

(10) Patent No.: US 9,338,333 B2
(45) Date of Patent: May 10, 2016

(54) IMAGE COLLECTOR DEVICE HAVING A SEALED SENSOR SPACE, AND METHOD OF SEALING A SENSOR SPACE IN AN IMAGE COLLECTOR DEVICE

(71) Applicant: Axis AB, Lund (SE)

(72) Inventors: Jens Pahlitzsch, Lund (SE); Johan Bergsten, Landskrona (SE); Niclas Möller Lewin, Malmö (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/516,262

(22) Filed: Oct. 16, 2014

(65) Prior Publication Data

US 2015/0181086 A1 Jun. 25, 2015

(30) Foreign Application Priority Data

Dec. 19, 2013 (EP) .................................... 13198408

(51) Int. Cl.
*H04N 5/225* (2006.01)
*G03B 17/12* (2006.01)

(52) U.S. Cl.
CPC .............. *H04N 5/2252* (2013.01); *G03B 17/12* (2013.01); *H04N 5/2253* (2013.01); *H04N 5/2254* (2013.01)

(58) Field of Classification Search
CPC . H04N 5/2252; H04N 5/2253; H04N 5/2254; G03B 17/12
USPC ........................................................ 348/374
See application file for complete search history.

(56) References Cited

U.S. PATENT DOCUMENTS

| | | | |
|---|---|---|---|
| 2,164,061 A | 6/1939 | Githens et al. | |
| 6,529,232 B1* | 3/2003 | Kraas et al. | A61B 1/00142 348/65 |
| 2004/0210108 A1 | 10/2004 | Shimizu et al. | |
| 2006/0219885 A1* | 10/2006 | Kinoshita et al. | H04N 1/024 250/239 |
| 2012/0133825 A1* | 5/2012 | Nakajima et al. | H04N 5/2253 348/374 |

FOREIGN PATENT DOCUMENTS

| | | |
|---|---|---|
| DE | 102005028144 A1 | 12/2006 |
| EP | 1841209 A1 | 10/2007 |
| GB | 2348296 A | 9/2000 |
| JP | 2004266844 A | 9/2004 |

OTHER PUBLICATIONS

EP 13 19 8408 European Search Report (May 9, 2004).

* cited by examiner

*Primary Examiner* — Gevell Selby
(74) *Attorney, Agent, or Firm* — Volpe and Koenig, P.C.

(57) ABSTRACT

An image collector device comprising a sensor arranged on a circuit board, a lens, and a lens holder. The lens is mounted in the lens holder. A sensor space, in which the sensor is arranged, is formed between the lens and the circuit board. The image collector device further comprises a sealing device comprising a first end and a second end. A resilient circumferential wall portion extends between the ends. An end wall is arranged at the first end, an opening being formed in the end wall. An end wall portion surrounding the opening is flexible. The sealing device is arranged in the sensor space, the circumferential wall portion being arranged around the sensor and sealing the sensor space. The circumferential wall portion is compressed in a direction along said sensor space between the lens and the circuit board, and the opening in the end wall encloses the lens.

10 Claims, 2 Drawing Sheets

IMAGE COLLECTOR DEVICE HAVING A SEALED SENSOR SPACE, AND METHOD OF SEALING A SENSOR SPACE IN AN IMAGE COLLECTOR DEVICE

FIELD OF INVENTION

The present invention relates to an image collector device having a sensor space in which a sensor is arranged, and to a method of sealing a sensor space in an image collector device.

BACKGROUND

In image collector devices it is oftentimes important to protect the sensor used for collecting images from harmful factors such as dust and light. An example of an image collector device where this problem may arise is a camera. In some cameras, a lens is mounted in a lens holder by engaging an outer thread on the lens with an inner thread on the lens holder. In this mounting operation, the threads may be slightly damaged or worn, such that metal particles are rubbed off the threads. There may also be cuttings left on the threads from the manufacturing of the lens. The metal particles or cuttings may fall on a sensor arranged behind the lens, and may damage the sensor, or at least decrease the image quality. Particularly, during transportation of cameras, any cuttings stuck on the threads may fall off. One way in which this problem may be dealt with is to apply grease on the thread of the lens, such that any cuttings are caught in the grease and do not fall down on the sensor. However, in some situations, this is not a satisfactory solution, since it does not actually prevent the cuttings from entering the sensor space in which the sensor is arranged, but only retains the cuttings on the threads. Further, mounting of image collector devices is in many cases done in a clean room environment, making grease a difficult additive to handle. Hence, a need remains for a solution to this problem.

SUMMARY

An object of the present invention is to provide an image collector device in which the sensor may be securely protected from harmful factors such as dust.

Another object is to provide an image collector device in which a sensor space may be tightly sealed.

A further object is to provide a method of sealing a sensor space in an image collector device which makes it possible to ensure that a sensor in the image collector device is securely protected from harmful factors such as dust.

According to a first aspect, these and other objects are achieved, in full or at least in part, by an image collector device comprising a sensor arranged on a circuit board, a lens, and a lens holder, said lens being mounted in said lens holder, wherein a sensor space, in which said sensor is arranged, is formed between said lens and said circuit board said monitoring device further comprising a sealing device comprising a first end, a second end, a resilient circumferential wall portion extending between said first and second ends, and an end wall arranged at said first end, an opening being formed in said end wall, wherein an end wall portion surrounding said opening is flexible, wherein said sealing device is arranged in said sensor space, said circumferential wall portion of said sealing device being arranged around said sensor and sealing said sensor space, wherein said circumferential wall portion is compressed in a direction along said sensor space between said lens and said circuit board, and wherein said opening in said end wall sealingly encloses said lens. In this manner, the sensor space may be tightly sealed, protecting the sensor from dust and particles from the lens holder.

The lens comprises an outer thread, and the lens holder comprises an inner thread, said lens being threadedly engaged in said lens holder, and the end wall portion surrounding the opening may be arranged between two adjacent flanks of said outer thread. This arrangement enables a particularly tight sealing of the sensor space. Further, this arrangement may provide a tight seal against cuttings rubbed off from the threads.

The lens may at least in a portion enclosed by the opening in the end wall have a circular cross-sectional shape, and the opening in the end wall may be circular. Such an arrangement may, for instance, allow the lens to be inserted in the opening in a rotating motion. In the rotating motion, cuttings or other particles on the thread may be pushed away by the end wall portion surrounding the opening, such that they are pushed away from the sensor space.

In an embodiment, the circumferential wall portion of the sealing device is pleated. Hereby, a suitable resilience of the circumferential wall portion may be achieved. A pleated circumferential wall portion may be compressed in a direction between the first and second ends of the sealing device, such that the sealing device fits within the sensor space. Such compression, along with flexibility of the material of which the sealing device is made, may provide an effective seal of the sensor space at both ends of the sealing device.

The circumferential wall portion of the sealing device may be shaped as a bellows. This is a practical way of achieving a suitable flexibility and resilience of the circumferential wall portion, such that the sealing device may be compressed to fit in the sensor space.

The circumferential wall portion of the sealing device may have a generally rectangular cross-sectional shape. Such a shape may make it possible to prevent the sealing device from rotating even if a lens is being inserted into the opening in a rotating motion.

The sealing device may comprise an elastomeric material. There are many elastomeric materials that are easily workable to desired shapes, and that may provide a suitable resilience.

In an embodiment, the sealing device is moulded from an elastomeric material. There are several moulding methods that may be used for manufacturing the sealing device, e.g., injection moulding or compression moulding.

The elastomeric material of the sealing device may comprise silicone rubber. Silicone is easily workable to suitable shapes and may be pre-treated not to emit gases that could be harmful to the sensor.

The sealing device may be arranged to seal the sensor space against particles and light. In this manner, the same sealing device may be used for protecting the sensor from dust and other particles, and from light.

According to a second aspect, the abovementioned objects are achieved, in full or at least in part, by a method of sealing a sensor space in an image collector device, said sensor space being defined between a lens arranged in a lens holder, and a circuit board on which a sensor is arranged, said method comprising the steps of arranging a sealing device between said lens and said circuit board, said sealing device having a first end, a second end, a resilient circumferential wall extending between said first and second ends, and an end wall at said first end, said end wall having an opening, an end wall portion surrounding said opening being flexible, arranging said opening in said end wall around said lens such that it sealingly encloses said lens, arranging said circumferential wall around said sensor, and compressing said sealing device between said lens holder and said circuit board, such that said circumferential wall flexes, pressing said first end against said lens holder, and pressing said second end against said circuit board, thereby sealing said sensor space. With such a method it is possible to securely seal a sensor space in an image collector device, such that the sensor may be protected from particles.

The method further comprises the steps of threadedly engaging said lens in said lens holder, and arranging said end wall portion surrounding said opening between two adjacent flanks of an outer thread of said lens, thereby forming a radial seal around said lens. While threading the lens into the lens holder, the lens may also be threaded into the opening of the sealing device. By arranging the end wall portion surrounding the opening in the end wall of the sealing device, a tight seal may be achieved. Further, any cuttings or other particles located in the threads on the lens may be pushed away by the end wall during the rotating threading motion, such that the particles are pushed outwards, away from the sensor space.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
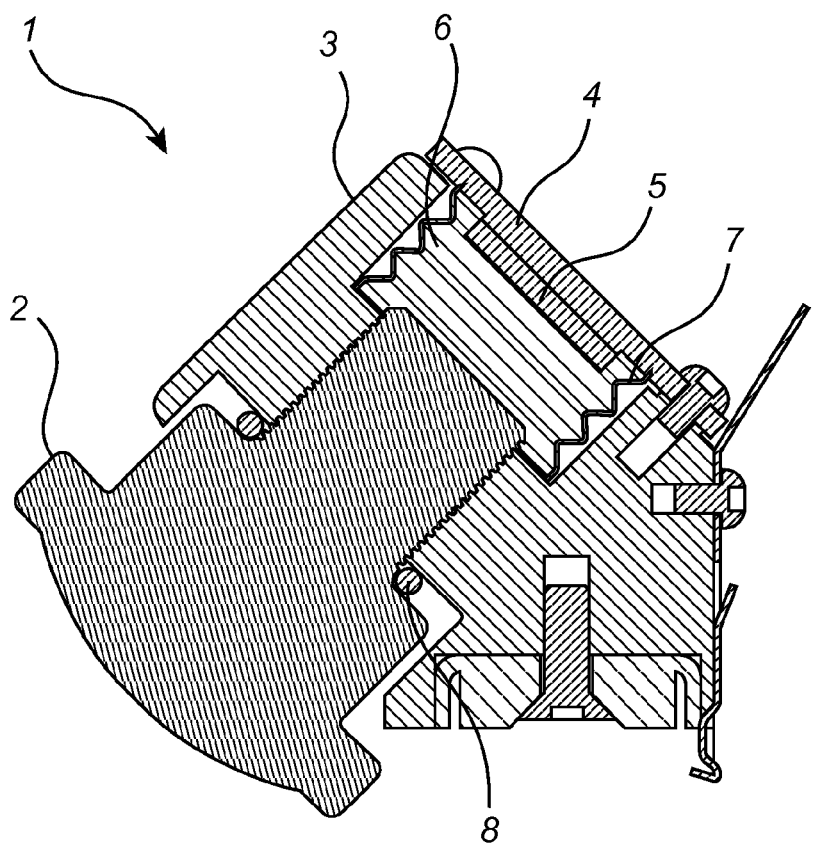
FIG. 1 is a sectional view of an image collector device according to an embodiment.

In FIG. 1 an image collector device 1 is shown. In this embodiment, the image collector device is a camera 1, having a lens 2 arranged in a lens holder 3. Further, the camera 1 has a circuit board 4 on which a sensor 5 is arranged. The circuit board is screwed onto the lens holder 3. A sensor space 6 is formed between the lens 2 and the circuit board 4. Thus, the sensor 5 is arranged in the sensor space 6. A sealing device 7 is arranged between the circuit board 4 and the lens 2. An additional seal in the form of an O-ring 8 is arranged around the lens outside the lens holder 3.

Figure 4:
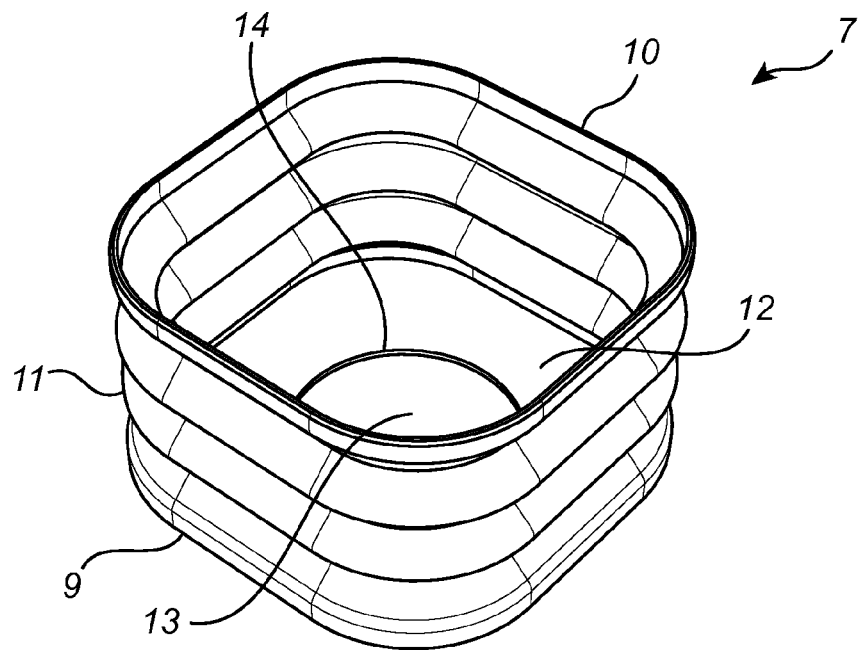
FIG. 4 is a perspective view of the sealing device of the image collector device of FIG. 1.

The sealing device 7 may be seen more clearly in FIG. 4, showing the sealing device 7 separately. The sealing device 7 has a first end 9 and a second end 10. A circumferential wall 11 extends between the first end 9 and the second end 10. In the embodiments shown, the circumferential wall 11 is pleated and may be referred to as bellows-shaped. At the first end 9, the sealing device 7 has an end wall 12, in which an opening 13 is formed. In this embodiment, the entire sealing device is flexible, but at least an end wall portion 14 surrounding the opening 13 should be flexible. The sealing device 7 is flexible enough to be compressible to fit in the sensor space, as will be discussed further below, and provides sufficient resilience to spring back when compressed, thus allowing a tight seal against the circuit board 4 and the lens holder 3, respectively. The sealing device may be moulded from silicone, by moulding processes such as injection moulding or compression moulding. The silicone may be hardened or otherwise treated such that it does not emit gasses once the sealing device 7 has been installed in the camera 1. Such gasses could else be harmful to the sensor 5.

In the embodiment shown, the sealing device 7 has a generally square cross-sectional shape with rounded corners. The opening 13 is circular to fit around a circular cross-section of the lens 2.

Figure 2:
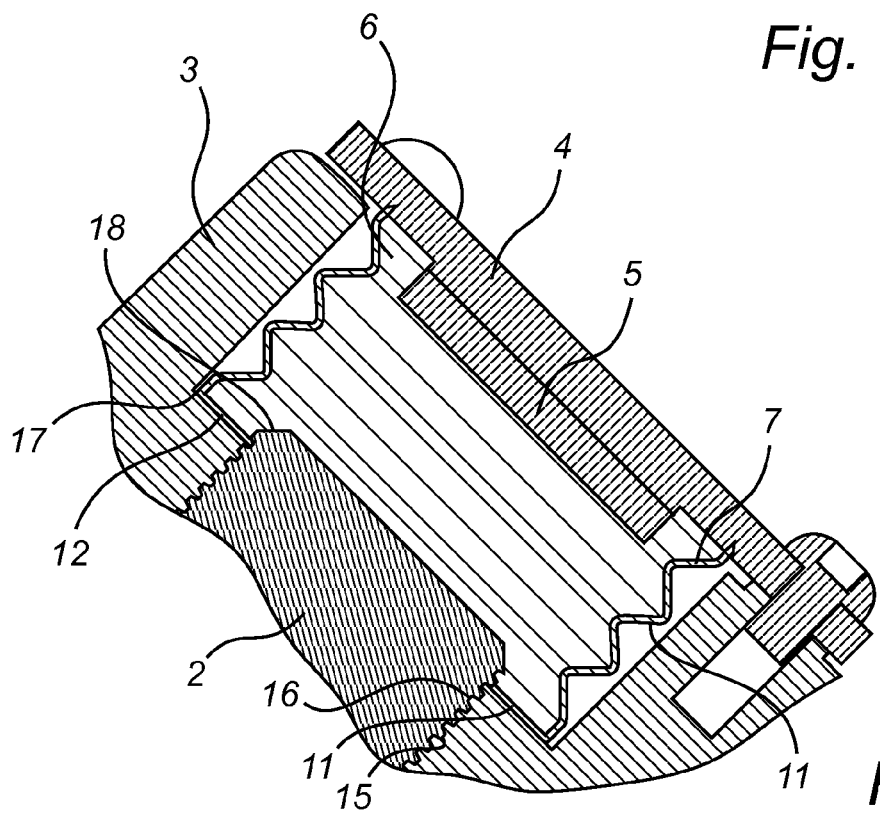
FIG. 2 is a detail view showing an end of a lens and a sealing device of the image collector device of FIG. 1.
Figure 3:
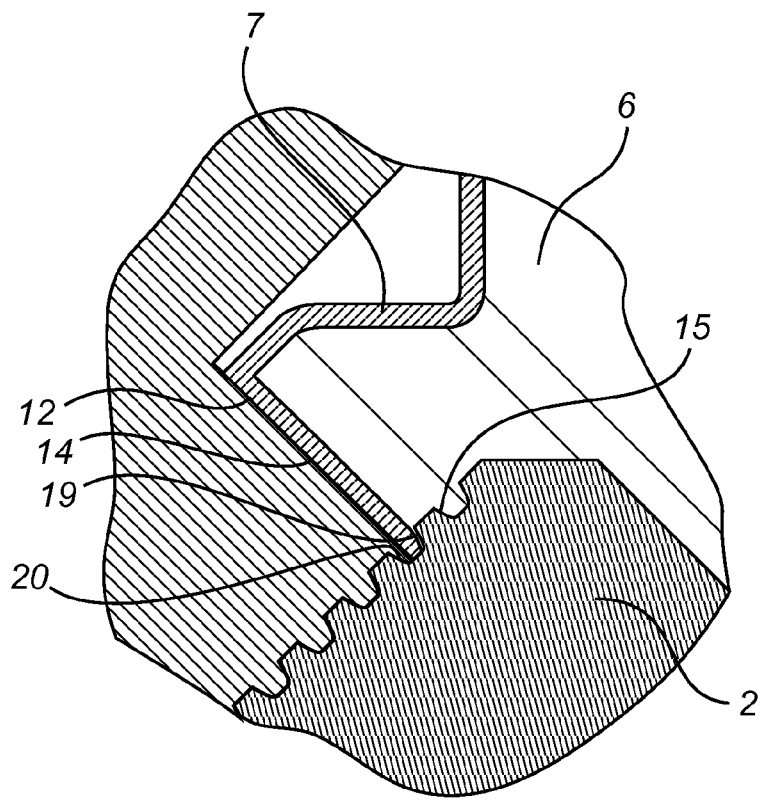
FIG. 3 is a detail view of part of an end wall of the sealing device arranged around the lens shown in FIG. 1.

With reference to FIG. 2, and to the closer detail view in FIG. 3, the arrangement of the sealing device 7 for sealing the sensor space 6 will be described further. In the embodiment shown, the lens 2 has an outer thread 15, and the lens holder 3 has an inner thread 16. The lens 2 may hereby be threadedly engaged in the lens holder 3. When mounting the camera components, the sealing device 7 is placed inside the lens holder 3 with the first end 9 facing the threaded part of the lens holder, where the lens 2 is to be inserted, and with the second end 10 facing the opposite part of the lens holder 3, where the circuit board 4 is to be attached. The end wall 12 of the sealing device 7 is placed in contact with an abutment shoulder 17 of the lens holder 3. Then, the lens 2 is screwed into the lens holder 3. When the inner end 18 of the lens 2 has passed the abutment shoulder 17, the lens 2 also starts to be inserted into the opening 13 in the end wall 12 of the sealing device 7. When the outer thread 15 of the lens reaches the opening 13, the lens 2 starts to be threaded into the opening. When the lens 2 has been screwed into the lens holder 3 to a desired depth, the end wall portion 14 surrounding the opening 13 is caught between two adjacent flanks 19, 20 of the outer thread. Particles possibly sticking on the thread 15 are pushed away by the end wall portion 14 surrounding the opening 13, and are hence prevented from entering the sensor space. The flexibility of the end wall portion 14 surrounding the opening 13 enables a good seal against the lens 2. The generally square cross-sectional shape of the sealing device 7 in combination with a similarly square cross-sectional shape of the inside of the lens holder beyond the abutment shoulder 17 makes it possible to prevent the sealing device 7 from rotating. The sealing device 7 may in this manner also be prevented from twisting. The circuit board 4 with the sensor is then screwed onto the lens holder 3, with the sensor 5 placed such that it becomes surrounded by the circumferential wall 11.

If extended to its full length, the sealing device 7 would be longer than the distance between the abutment shoulder 17 and the circuit board. Therefore, when the circuit board 4 is attached to the lens holder 3, the sealing device 7 is compressed between the abutment shoulder 17 of the lens holder 3 and the circuit board 4. Because of the resilience of the circumferential wall 11 a tight seal of the sensor space 6 may be achieved. The desired resilience may be achieved by a suitable combination of a resilient and flexible material and an appropriate shape of the circumferential wall 11. The resilience should be such that the sealing device 7 may be compressed to fit in the sensor space 6 and such that it springs back to extend the whole length of the sensor space, and to abut tightly against the circuit board 4 and the lens holder 3. When the sealing device 7 is compressed between the circuit board 4 and the abutment shoulder an axial seal of the sensor space is achieved. Further, the arrangement of the flexible end wall portion 14 surrounding the opening 13 between two adjacent flanks 19, 20 of the outer thread 15 of the lens ensures a radial seal.

It will be appreciated that a person skilled in the art can modify the above described embodiments in many ways and still use the advantages of the invention as shown in the embodiments above. As an example, the lens holder need not be of the type shown on the drawings, where the circuit board is attached directly to the lens holder. Instead, the lens could be screwed into a shorter lens holder and then be inserted into a housing to which the circuit board is attached. In such case, the end wall of the sealing device could be placed in abutment with a suitable wall portion or abutment shoulder of the housing.

The sealing device may be made from silicone or from another elastomeric material such as polyurethane or other thermoplastic elastomer. The material may be treated in order to prevent it from emitting gasses that could be harmful to the sensor. For instance, in the case of silicone, the material may be double-hardened.

The sealing device may be made from just one material or could be made from a combination of materials. For instance, the sealing device may be made from metallic end portions, with a flexible circumferential end portion arranged there between, and with a flexible end wall arranged at the first end. Further, the sealing device could be made from mainly an elastomeric material with a relatively low hardness, and with a harder reinforcing ring arranged or embedded at each end.

The material of the circumferential wall may be chosen such that it is impermeable to dust and other particles, to moisture, and to light, thus protecting the sensor space, and the sensor arranged therein, from these potentially harmful factors.

The opening in the end wall may have a diameter that is slightly smaller than the minor diameter of the threaded portion of the lens, such that the flexibility of the end wall portion surrounding the opening ensures a tight fit around the lens.

The circumferential wall of the sealing device could have other shapes, apart from the bellows shape shown in the exemplifying figures. For instance, the circumferential wall could be made with straight, fairly non-flexible wall portions between highly flexible wall portions or beads. Further, the sealing device could have another cross-sectional shape, such as circular. If the cross-sectional shape is polygonal, the corners may make it possible to prevent the sealing device from rotating or twisting when a lens is screwed into the opening in the end wall if the walls of the lens holder or housing have corresponding surfaces against which the corners may abut.

The sealing device may be made by moulding, e.g., injection moulding or compression moulding.

In the embodiment shown, the sealing device is simply compressed between the lens holder and the circuit board. In some instances it may be desirable to fix one or both ends of the sealing device to the lens holder and circuit board, respectively, by glue or other fixing means.

In the description above, reference has been made to the image collector device as a camera. The camera may be a camera employing visible light or IR light. Further, the camera may be a thermal camera. Still further, the image collector device may be of other types, such as an IR detector.

Thus, the invention should not be limited to the shown embodiments but should only be defined by the appended claims.

What is claimed is:

1. An image collector device comprising:
a sensor arranged on a circuit board;
a lens; and
a lens holder;
said lens being mounted in said lens holder;
wherein a sensor space, in which said sensor is arranged, is formed between said lens and said circuit board;
said image collector device further comprising a sealing device comprising:
a first end;
a second end;
a resilient circumferential wall portion extending between said first and second ends; and
an end wall arranged at said first end;
an opening being formed in said end wall;
wherein an end wall portion surrounding said opening is flexible;
wherein said sealing device is arranged in said sensor space, said circumferential wall portion of said sealing device being arranged around said sensor and sealing said sensor space;
wherein said circumferential wall portion is compressed in a direction along said sensor space between said lens and said circuit board;
wherein said opening in said end wall sealingly encloses said lens; and wherein said lens comprises an outer thread, and said lens holder comprises an inner thread, said lens being threadedly engaged in said lens holder, wherein said end wall portion surrounding said opening is arranged between two adjacent flanks of said outer thread.

2. The image collector device according to claim 1, wherein said lens at least in a portion enclosed by said opening in said end wall has a circular cross-sectional shape; and wherein said opening in said end wall is circular.

3. The image collector device according to claim 1, wherein said circumferential wall portion is pleated.

4. The image collector device according to claim 1, wherein said circumferential wall portion is shaped as a bellows.

5. The image collector device according to claim 1, wherein said circumferential wall portion has a generally rectangular cross-sectional shape.

6. The image collector device according to claim 1, wherein said sealing device comprises an elastomeric material.

7. The image collector device according to claim 1, wherein said sealing device is moulded from an elastomeric material.

8. The image collector device according to claim 1, wherein said elastomeric material comprises silicone rubber.

9. The image collector device according to claim 1, wherein said sealing device is arranged to seal said sensor space against particles and light.

10. A method of sealing a sensor space in an image collector device, said sensor space being defined between a lens arranged in a lens holder (3), and a circuit board on which a sensor is arranged, said method comprising the steps of:
arranging a sealing device between said lens and said circuit board, said sealing device having a first end, a second end, a resilient circumferential wall extending between said first and second ends, and an end wall at said first end, said end wall having an opening, an end wall portion surrounding said opening being flexible;

arranging said opening in said end wall around said lens such that it sealingly encloses said lens;

arranging said circumferential wall around said sensor;

compressing said sealing device between said lens holder and said circuit board, such that said circumferential wall flexes, pressing said first end against said lens holder, and pressing said second end against said circuit board (4), thereby sealing said sensor space;

threadedly engaging said lens in said lens holder; and arranging said end wall portion surrounding said opening between two adjacent flanks of an outer thread of said lens, thereby forming a radial seal around said lens.

* * * * *